United States Patent
Kikuchi et al.

(10) Patent No.: US 11,912,873 B2
(45) Date of Patent: Feb. 27, 2024

(54) POLYMER COMPOSITION, CROSSLINKED POLYMER, AND TIRE

(71) Applicant: ENEOS Materials Corporation, Tokyo (JP)

(72) Inventors: Toshimitsu Kikuchi, Tokyo (JP); Takuya Sano, Tokyo (JP); Hirofumi Senga, Tokyo (JP); Yuto Sakagami, Tokyo (JP); Takato Fukumoto, Tokyo (JP); Toshiyuki Hayakawa, Tokyo (JP)

(73) Assignee: ENEOS Materials Corporation, Tokyo (JP)

( * ) Notice: Subject to any disclaimer, the term of this patent is extended or adjusted under 35 U.S.C. 154(b) by 584 days.

(21) Appl. No.: 17/161,688

(22) Filed: Jan. 29, 2021

(65) Prior Publication Data
US 2021/0238396 A1 Aug. 5, 2021

(30) Foreign Application Priority Data
Feb. 5, 2020 (JP) ................. 2020-017736

(51) Int. Cl.
*C08L 9/06* (2006.01)
*B60C 1/00* (2006.01)
*C08K 5/00* (2006.01)

(52) U.S. Cl.
CPC .............. *C08L 9/06* (2013.01); *B60C 1/0016* (2013.01); *B60C 1/0025* (2013.01); *C08K 5/0025* (2013.01)

(58) Field of Classification Search
CPC ....... C08L 9/06; B60C 1/0016; B60C 1/0025; C08K 5/0025
See application file for complete search history.

(56) References Cited

U.S. PATENT DOCUMENTS

2012/0190786 A1 7/2012 Sasaki

FOREIGN PATENT DOCUMENTS

| CN | 102575083 | 7/2012 |
| EP | 2484723 | 8/2012 |
| WO | 2017014281 | 1/2017 |

OTHER PUBLICATIONS

"Search Report of Europe Counterpart Application", dated Aug. 13, 2021, p. 1-p. 6.
"Office Action of China Counterpart Application", dated Apr. 13, 2023, with English translation thereof, pp. 1-12.

*Primary Examiner* — Angela C Scott
(74) *Attorney, Agent, or Firm* — JCIPRNET

(57) ABSTRACT

There is provided a polymer composition using which a molded product having excellent balance between rigidity, wear resistance, viscoelastic properties, and heat resistance can be obtained.
A polymer composition according to the disclosure includes (A) a conjugated diene rubber (where, a polymer corresponding to the following component (B) is excluded); and (B) a hydrogenated product of a polymer that satisfies the following (1) to (3), which is a polymer in which 80% or more of structural units derived from butadiene are hydrogenated:
 (1) being a copolymer of a conjugated diene compound containing butadiene and an aromatic vinyl compound,
 (2) including a polybutadiene block having a vinyl group content of 20% or less, and
 (3) including a block composed of a conjugated diene compound and an aromatic vinyl compound.

4 Claims, No Drawings

POLYMER COMPOSITION, CROSSLINKED POLYMER, AND TIRE

CROSS-REFERENCE TO RELATED APPLICATION

This application claims the priority of Japan patent application serial no. 2020-017736, filed on Feb. 5, 2020. The entirety of the above-mentioned patent application is hereby incorporated by reference herein and made a part of this specification.

BACKGROUND

Technical Field

The disclosure relates to a polymer composition, a crosslinked polymer, and a tire made using the crosslinked polymer.

Description of Related Art

Polymer compositions containing a conjugated diene rubber have various favorable characteristics such as heat resistance, wear resistance, mechanical strength, and moldability, and thus are used for various applications such as pneumatic tires and hoses, and anti-vibration rubber.

It is known that, when a polyolefin resin such as linear low density polyethylene (LLDPE) or a hydrogenated resin such as a styrene/ethylene butylene/styrene block polymer (SEBS) and an olefin crystal/ethylene butylene/olefin crystal block polymer (CEBC) is added to such a polymer composition, it is possible to improve rigidity of a molded product (for example, refer to Patent Document 1).

PATENT DOCUMENTS

[Patent Document 1] PCT International Publication No. WO 2017-014281

However, the molded product of the polymer compositions to which these hydrogenated resins are added has a problem in balance between wear resistance and viscoelastic properties. One factor that contributes to this deterioration of the balance between these characteristics is considered to be that sufficient performance is not exhibited due to poor compatibility with conjugated diene rubber because all have a low-polarity olefin structure.

In addition, SEBS in which a constraining layer is composed of only styrene blocks has a problem that, for example, polystyrene blocks are in a glass state in a normal temperature range for tires, molecule movement cannot be sufficiently restricted at a high temperature/for a long time due to a glass transition phenomenon, and adverse effects on viscoelastic properties (RR property) are likely to occur.

SUMMARY

A polymer composition according to an aspect of the disclosure includes
  (A) a conjugated diene rubber (where, a polymer corresponding to the following component (B) is excluded); and
  (B) a hydrogenated product of a polymer that satisfies the following (1) to (3), which is a polymer in which 80% or more of structural units derived from butadiene are hydrogenated:
  (1) being a copolymer of a conjugated diene compound containing butadiene and an aromatic vinyl compound,
  (2) including a polybutadiene block having a vinyl group content of 20% or less, and
  (3) including a block composed of a conjugated diene compound and an aromatic vinyl compound.

In the polymer composition according to the above aspect, when constituent proportions of a structural unit represented by the following Formula (1), a structural unit represented by the following Formula (2), a structural unit represented by the following Formula (3), and a structural unit represented by the following Formula (4) are set as p, q, r, and s, respectively, the component (B) may be a hydrogenated conjugated diene polymer that satisfies the following Formula (A):

$$0.80 \leq (p+(0.5 \times r))/(p+q+(0.5 \times r)+s) \leq 0.98 \quad (A)$$

[Chem. 1]

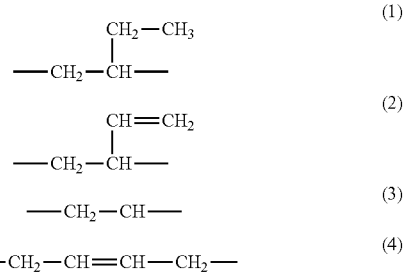

The polymer composition according to any of the above aspects may further include a crosslinking agent.

A crosslinked polymer according to an aspect of the disclosure is produced using the polymer composition according to any of the above aspects.

A tire according to an aspect of the disclosure uses the crosslinked polymer according to the above aspect.

DESCRIPTION OF THE EMBODIMENTS

In order to address such problems, a polymer composition using which a molded product having excellent balance between rigidity, wear resistance, and viscoelastic properties can be obtained is required.

According to the polymer composition of the disclosure, it is possible to obtain a molded product having excellent balance between rigidity, wear resistance, and viscoelastic properties.

Preferable embodiments of the disclosure will be described below in detail. Here, the disclosure is not limited to the embodiments described below, and should be understood to include various modifications that are performed without changing the spirit and scope of the disclosure.

In this specification, the numerical value range described using "to" means that numerical values stated before and after "to" are included as a lower limit value and an upper limit value.

1. POLYMER COMPOSITION

A polymer composition according to one embodiment of the disclosure includes
- (A) a conjugated diene rubber (where, a polymer corresponding to the following component (B) is excluded; hereinafter referred to as a "component (A)") and
- (B) a hydrogenated product of a polymer that satisfies the following (1) to (3), which is a polymer in which 80% or more of structural units derived from butadiene are hydrogenated (hereinafter referred to as a "component (B)"):
  - (1) being a copolymer of a conjugated diene compound containing butadiene and an aromatic vinyl compound,
  - (2) including a polybutadiene block having a vinyl group content of 20% or less, and
  - (3) including a block composed of a conjugated diene compound and an aromatic vinyl compound.

1.1. Component (A)

The polymer composition according to the present embodiment includes a conjugated diene rubber (A). The conjugated diene rubber (A) is not particularly limited as long as it is a conjugated diene rubber which includes a structural unit derived from a conjugated diene compound and does not correspond to the component (B) to be described below.

Specific examples of the component (A) include butadiene rubber (BR), styrene-butadiene rubber (SBR), natural rubber (NR), isoprene rubber (IR), acrylonitrile-butadiene rubber (NBR), aromatic vinyl-conjugated diene copolymer rubbers other than styrene-butadiene rubber (for example, styrene-isoprene rubber, styrene-butadiene-isoprene rubber (SBIR)), styrene-isoprene rubber (SIR), styrene-isoprene-butadiene rubber (SIBR), hydrogenated butadiene rubber, and hydrogenated styrene-butadiene rubber. Among these, butadiene rubber (BR), styrene-butadiene rubber (SBR), hydrogenated styrene-butadiene rubber, and natural rubber (NR) are preferable. These components (A) may be used alone or two or more thereof may be used in combination.

1.2. Component (B)

The component (B) contained in the polymer composition according to the present embodiment is a copolymer of a conjugated diene compound containing butadiene and an aromatic vinyl compound, and is a hydrogenated product of a copolymer including a polybutadiene block having a vinyl group content of 20% or less and a block composed of a conjugated diene compound and an aromatic vinyl compound.

The proportional content of the component (B) in the polymer composition according to the present embodiment is preferably 1 to 50 parts by mass, more preferably 3 to 40 parts by mass, still more preferably 5 to 30 parts by mass, and particularly preferably 10 to 20 parts by mass with respect to a total amount of 100 parts by mass of the component (A). When the proportional content of the component (B) is within the above range, it is possible to obtain a molded product having excellent balance between rigidity, wear resistance, and viscoelastic properties.

The polymer of the component (B) before hydrogenation is preferably a block copolymer including a polymer block A and a polymer block B in the molecule (hereinafter simply referred to as a "block copolymer"). Here, the polymer block A is a polybutadiene block having a vinyl group content of 20% or less, and the polymer block B is a block composed of a conjugated diene compound and an aromatic vinyl compound.

1.2.1. Polymer Block A

The polymer block A is a polybutadiene block having a vinyl group content of 20% or less. The polymer block A includes a structural unit derived from 1,3-butadiene.

The vinyl group content in the polymer block A is 20% or less, preferably 15% or less, and more preferably 12% or less. The lower limit value of the vinyl group content in the polymer block A is not particularly limited. When the vinyl group content in the polymer block A is within the above range, the mechanical strength is improved so that rigidity is imparted to a molded product and the balance between physical properties including viscoelastic properties is improved.

Here, "vinyl group content" in the disclosure refers to a total proportion (mass %) of vinyl groups incorporated in the form having a 1,2-bond and 3,4-bond among conjugated diene compounds incorporated in the form of having a 1,2-bond, 3,4-bond and 1,4-bond into the polymer block before hydrogenation.

1.2.2. Polymer Block B

The polymer block B is a polymer block composed of a conjugated diene compound and an aromatic vinyl compound. The polymer block B includes a structural unit derived from a conjugated diene compound for imparting rigidity and a structural unit derived from an aromatic vinyl compound for imparting flexibility and improving viscoelastic properties.

Examples of conjugated diene compounds used for polymerization include 1,3-butadiene, isoprene, 2,3-dimethyl-1,3-butadiene, 1,3-pentadiene, 1,3-hexadiene, 1,3-heptadiene, 2-phenyl-1,3-butadiene, 3-methyl-1,3-pentadiene, and 2-chloro-1,3-butadiene. Among these, 1,3-butadiene, isoprene, and 2,3-dimethyl-1,3-butadiene are preferable, and 1,3-butadiene is more preferable. These conjugated diene compounds may be used alone or two or more thereof may be used in combination.

Examples of aromatic vinyl compounds used for polymerization include styrene, tert-butylstyrene, α-methylstyrene, p-methylstyrene, p-ethylstyrene, divinylbenzene, 1,1-diphenylstyrene, vinylnaphthalene, vinylanthracene, N,N-diethyl-p-aminoethylstyrene, and vinylpyridine. Among these, styrene is particularly preferable.

Regarding the structural unit derived from a conjugated diene compound in the polymer block B, the amount thereof contained in the polymer block B is preferably 50 mass % or more, more preferably 65 to 95 mass %, and particularly preferably 75 to 90 mass %. When the proportional content of the structural unit derived from a conjugated diene compound in the polymer block B is within the above range, the balance between rigidity, wear resistance, and viscoelastic properties of the molded product is improved.

Regarding the structural unit derived from an aromatic vinyl compound in the polymer block B, the amount thereof contained in the polymer block B is preferably less than 50 mass %, more preferably 5 to 35 mass %, and particularly preferably 10 to 25 mass %. When the proportional content of the structural unit derived from an aromatic vinyl compound in the polymer block B is within the above range, since the compatibility with the component (A) can be improved, the balance between rigidity, wear resistance, and viscoelastic properties is improved.

Here, the distribution of structural units derived from a conjugated diene compound in the polymer block B is random, tapered (the number of structural units derived from a conjugated diene compound increases or decreases along the molecular chain), partially block-like, or in a form of any combination thereof.

The vinyl group content in the polymer block B is preferably 20% or more, more preferably 20 to 90%, still more preferably 25 to 80%, and particularly preferably 25 to 70%. When the vinyl group content in the polymer block B is within the above range, viscoelastic properties of the molded product can be improved without impairing rigidity and wear resistance imparted by the polymer block A.

1.2.3. Block Configuration

When the total amount of the polymer block A and the polymer block B in the block copolymer is set as 100 mass %, the proportional content of the polymer block A is preferably 20 to 80 mass %, more preferably 25 to 75 mass %, still more preferably 30 to 70 mass %, and particularly preferably 35 to 60 mass %. On the other hand, when the total amount of the polymer block A and the polymer block B in the block copolymer is set as 100 mass %, the proportional content in the polymer block B is preferably 80 to 20 mass %, more preferably 75 to 25 mass %, still more preferably 70 to 30 mass %, and particularly preferably 60 to 35 mass %. When the proportional content of the polymer block A and the polymer block B in the block copolymer is within the above range, the balance between rigidity, wear resistance, and viscoelastic properties of the molded product is improved.

The structure of the block copolymer is not particularly limited as long as it satisfies the above requirements, and examples thereof include structures represented by the following Structural Formulae (1) to (3).

$$(A-B)_{n1} \qquad \text{Structural Formula (1):}$$

$$(A-B)_{n2}-A \qquad \text{Structural Formula (2):}$$

$$(B-A)_{n3}-B \qquad \text{Structural Formula (3):}$$

In Structural Formulae (1) to (3), A represents a polymer block A, B represents a polymer block B, and n1 to n3 represent an integer of 1 or more. Here, when at least two or more of the polymer block A and the polymer block B are present in the block copolymers represented by Structural Formulae (1) to (3), the respective polymer blocks may be the same or different from each other.

In addition, the structure of the block copolymer may be, for example, a structure in which a copolymer block extends or branches via a coupling agent residue as in the structures represented by the following Structural Formulae (4) to (7).

$$(A-B)_m X \qquad \text{Structural Formula (4):}$$

$$(B-A)_m X \qquad \text{Structural Formula (5):}$$

$$(A-B-A)_m X \qquad \text{Structural Formula (6):}$$

$$(B-A-B)_m X \qquad \text{Structural Formula (7):}$$

In Structural Formulae (4) to (7), A represents a polymer block A, B represents a polymer block B, m represents an integer of 2 or more, and X represents a coupling agent residue. A structure enclosed by round parentheses and having X indicates that the block closest to X in the parentheses is directly bonded to X. For example, $(A-B)_m X$ indicates that m (A-B)s are directly bonded to X by the polymer block B.

In addition, the structure of the block copolymer may include optional components including polymer blocks C and D, for example, as in the following Structural Formulae (8) and (9).

$$A-B-C \qquad \text{Structural Formula (8):}$$

$$A-B-C-D \qquad \text{Structural Formula (9):}$$

Regarding the structure of the block copolymer, among the structures represented by Structural Formulae (1) to (9), the structures represented by Structural Formulae (1), (2), (3), (7), (8) and (9) are preferable.

In addition, the block copolymer may be terminal-modified. When the block copolymer is terminal-modified, the balance between wear resistance and viscoelastic properties may be improved. The method of terminal-modifying the block copolymer is not particularly limited, and for example, methods described in Japanese Patent Laid-Open No. 2014-177519, Japanese Patent Laid-Open No. 2016-079217, PCT International Publication No. WO 2017/090421, and PCT International Publication No. WO 2017/221943 can be used.

The coupling rate in the block copolymer is preferably 50 to 90% in consideration of processability during molding. Here, a rate at which molecules are linked via a coupling agent is defined as a coupling rate.

Examples of coupling agents include 1,2-dibromoethane, methyldichlorosilane, dimethyldichlorosilane, trichlorosilane, methyltrichlorosilane, tetrachlorosilane, tetramethoxysilane, divinylbenzene, diethyl adipate, dioctyl adipate, benzene-1,2,4-triisocyanate, tolylene diisocyanate, epoxidized 1,2-polybutadiene, epoxidized linseed oil, tetrachlorogermanium, tetrachlorotin, butyltrichlorotin, butyltrichlorosilane, dimethylchlorosilane, 1,4-chloromethylbenzene, and bis(trichlorosilyl)ethane.

The block copolymer can be produced by the method described in, for example, Japanese Patent No. 3134504, and Japanese Patent No. 3360411.

1.2.4. Hydrogen Addition (Hydrogenation)

The hydrogenation rate of the component (B) is 80% or more, preferably 81% or more, more preferably 82% or more, and particularly preferably 83% or more of the structural units derived from butadiene. On the other hand, the hydrogenation rate of the component (B) is preferably 98% or less, more preferably 97% or less, and particularly preferably 96% or less of the structural units derived from butadiene. When the hydrogenation rate of the component (B) is within the above range, since it is possible to improve the cross-linkability and interaction, the wear resistance and processability of the molded product are improved. Here, the hydrogenation rate of the component (B) is a value of α in the following Formula (A) when constituent proportions (molar ratio) of a structural unit represented by the following Formula (1), a structural unit represented by the following Formula (2), a structural unit represented by the following Formula (3), and a structural unit represented by the following Formula (4) in the polymer measured by $^1$H-NMR are set as p, q, r, and s, respectively.

$$\alpha=(p+(0.5\times r))/(p+q+(0.5\times r)+s) \qquad (A)$$

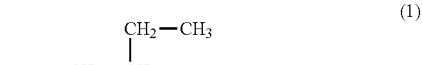

(1)

(2)

(3)

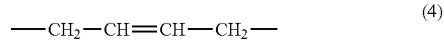

(4)

The hydrogenation method and reaction conditions for the block copolymer are not particularly limited, and generally, the method is performed at 20 to 120° C. and a hydrogen pressure of 0.1 to 10 MPa, and in the presence of a hydrogenation catalyst. In this case, the hydrogenation rate can be appropriately adjusted by changing the amount of the hydrogenation catalyst, the hydrogen pressure during the hydrogenation reaction, the reaction time, and the like.

Examples of hydrogenation catalysts include hydrogenation catalysts described in Japanese Patent Laid-Open No. H1-275605, Japanese Patent Laid-Open No. H5-271326, Japanese Patent Laid-Open No. H5-271325, Japanese Patent Laid-Open No. H5-222115, Japanese Patent Laid-Open No. H11-292924, Japanese Patent Laid-Open No. 2000-37632, Japanese Patent Laid-Open No. S59-133203, Japanese Patent Laid-Open No. S63-5401, Japanese Patent Laid-Open No. S62-218403, Japanese Patent Laid-Open No. H7-90017, Japanese Examined Patent Publication No. S43-19960, and Japanese Examined Patent Publication No. S47-40473. Here, the hydrogenation catalysts may be used alone or two or more thereof may be used in combination.

After hydrogenation, as necessary, the catalyst residue is removed or a phenol-based or amine-based antioxidant is added, and a hydrogenated diene-based (co)polymer is then separated from a hydrogenated diene-based (co)polymer solution. Separation of the hydrogenated diene-based (co)polymer can be performed by, for example, a method of adding acetone, an alcohol or the like to a hydrogenated diene-based (co)polymer solution and performing precipitation or a method of pouring a hydrogenated diene-based (co)polymer solution into hot water with stirring and removing a solvent by distillation.

Since the polymer block A is a polybutadiene block having a vinyl group content of less than 20%, it has a structure similar to that of polyethylene by hydrogenation, and becomes a polymer block having favorable crystallinity. On the other hand, in the polymer block B, the compatibility with the component (A) can be improved by arranging the aromatic vinyl compound at the olefin structure site. Therefore, it is possible to improve balance between physical properties including viscoelastic properties while imparting rigidity to the molded product. In addition, when the hydrogenation rate is set to be within a specific range, unsaturated bonds are appropriately introduced into the olefinic block, the compatibility and co-cross-linkability between the component (A) and the component (B) are improved, and thus the balance between wear resistance and viscoelastic properties is improved along with processability of the molded product.

1.2.5. Weight Average Molecular Weight

The weight average molecular weight of the component (B) is preferably 100,000 to 600,000, more preferably 100,000 to 400,000, still more preferably 100,000 to 300,000, and particularly preferably 100,000 to 250,000. When the weight average molecular weight of the component (B) is within the above range, a molded product having excellent processability and excellent viscoelastic properties is easily obtained. Here, "weight average molecular weight" referred to herein refers to a weight average molecular weight in terms of polystyrene measured by gel permeation chromatography (GPC).

1.2.6. Physical Properties

<Storage Young's Modulus E'>

The storage Young's modulus E' of the component (B) at 25° C. is preferably 5 to 80 MPa, more preferably 10 to 70 MPa, still more preferably 15 to 60 MPa, and particularly preferably 15 to 50 MPa. When the storage Young's modulus E' at 25° C. is within the above range, it is possible to prevent stickiness of the molded product and mutual adhesion of pellets, and the processability may be improved.

Here, the "storage Young's modulus E' at 25° C." in the disclosure is a storage Young's modulus at 25° C. obtained by measuring a dynamic viscoelastic spectrum at a temperature rising rate of 3° C./min, and a shear rate 6.28 radians/sec in a constant rate temperature rise tension mode using a dynamic viscoelastic device (model number "RSA" commercially available from Leometrics).

<Tan δ>

The height of tan δ of the component (B) at 25° C. is preferably 0.10 or more, more preferably 0.11 or more, and particularly preferably 0.12 or more. When tan δ at 25° C. is within the range, a molded product having excellent balance between rigidity and viscoelastic properties may be obtained.

The height of tan δ of the component (B) at 50° C. is preferably less than 0.10, more preferably less than 0.08, and particularly preferably less than 0.06. When tan δ at 25° C. is within the above range, a molded product having excellent rigidity and wear resistance may be obtained.

The tan δ peak of the component (B) is preferably in a range of −70° C. to +10° C., more preferably in a range of −60° C. to +5° C., and particularly preferably in a range of −50° C. to 0° C. In addition, the height of the tan δ peak is preferably 0.20 or more, more preferably 0.25 or more, and particularly preferably 0.30 or more. When the tan δ peak of the component (B) satisfies such conditions, a molded product having excellent rigidity and wear resistance may be obtained. In addition, when the molded product is a tire, steering stability during driving may be improved.

Here, "tan δ" in the disclosure is a value measured using the component (B) as a measurement sample, and using an ARES-RDA (commercially available from TA Instruments) at a shear strain of 1.0%, an angular velocity 100 radians/sec and under desired temperature conditions.

<Melting Point Peak Temperature and Amount of Heat Fusion>

The melting point peak temperature of the component (B) is preferably 50° C. or higher, more preferably 65° C. to 130° C., and particularly preferably 75° C. to 110° C. When the melting point peak temperature is within the above range, a molded product having excellent balance between rigidity and wear resistance may be obtained.

The amount of heat fusion of the component (B) is preferably 20 to 90 J/g, more preferably 25 to 80 J/g, and particularly preferably 30 to 75 J/g. When the amount of heat fusion is within the above range, it is possible to prevent stickiness of the molded product and mutual adhesion of pellets, and the processability may be improved.

Here, the melting point peak temperature and the amount of heat fusion of the component (B) are measured by differential scanning calorimetry (DSC method). Specifically, the melting point peak temperature is a peak temperature for a heat flow rate (this is referred to as an "amount of heat fusion") when differential scanning calorimetry (DSC) is used, a sample elastomer is maintained at 200° C. for 10 minutes, and then cooled to −80° C. at a rate of 10° C./min, then maintained at −80° C. for 10 minutes, and then heated at a rate of 10° C./min.

<Iodine Number>

The iodine number of the component (B) is preferably 3 to 100, more preferably 3 to 70, and particularly preferably 4 to 40. When the iodine number is within the above range, since the reactivity of the component (B) becomes appropriate, the heat resistance of the molded product after the cross-linking treatment may be improved.

Here, the iodine number of the component (B) can be measured by the test method described in "JIS K 0070: 1992." Here, the iodine number is a value indicating the amount of halogen that reacts with 100 g of a target substance in terms of the number of grams of iodine.

<Melt Flow Rate (MFR)>

The melt flow rate (MFR) of the component (B) measured at 230° C. and a load of 21.2 N is preferably 0.1 to 50 g/10 minutes, more preferably 0.2 to 10 g/10 minutes, and particularly preferably 0.5 to 5 g/10 minutes. When the MFR measured at 230° C. and a load of 21.2 N is within the above range, this is preferable because the load during molding decreases and the processability tends to become favorable. Here, the melt flow rate (MFR) can be determined by measuring at 230° C. and a load of 21.2 N according to the test method described in "JIS K 7210."

1.3. Other Components

The polymer composition according to the present embodiment preferably contains a crosslinking agent in addition to the component (A) and the component (B). Examples of crosslinking agents include sulfur, sulfur halides, organic peroxides, quinone dioximes, organic multivalent amine compounds, and alkylphenol resins having methylol groups, and sulfur is generally used. The proportional content of the crosslinking agent is preferably 0.1 to 5 parts by mass, and more preferably 0.5 to 3 parts by mass with respect to a total amount of 100 parts by mass of the polymer component contained in the polymer composition.

The polymer composition according to the present embodiment may contain a reinforcing filler such as silica, carbon black, clay, and calcium carbonate as a filler. Preferably, carbon black, silica, or a combination of carbon black and silica is used. A total amount of silica and carbon black in the polymer composition according to the present embodiment is preferably 20 to 130 parts by mass, and more preferably 25 to 110 parts by mass with respect to a total amount of 100 parts by mass of the polymer component contained in the polymer composition.

In addition, the polymer composition according to the present embodiment may contain, in addition to the above components, various additives that are generally used in a tire rubber composition, for example, zinc oxide, stearic acid, an antioxidant, a vulcanization accelerator, a softening agent, sulfur, a silane coupling agent, a compatibilizer, a vulcanization aid, a processing aid, extender oil (process oil), and a scorch inhibitor. The blending proportions thereof can be appropriately selected according to various components as long as the effects of the present disclosure are not impaired.

1.4. Applications

In the polymer composition according to the present embodiment, in addition to the polymer component and the crosslinking agent, components to be added as necessary are kneaded using a kneading machine such as an open type kneading machine (for example, roller) and a closed type kneading machine (for example, a Banbury mixer), and crosslinked (vulcanized) after molding, and thus the polymer composition can be applied as a crosslinked polymer to various rubber products. Specifically, for example, the polymer composition can be applied to tire applications such as tire treads, under treads, carcasses, sidewalls, and bead parts; sealing materials such as packings, gaskets, weather strips, and O-rings; interior and exterior skin materials for various vehicles such as automobiles, ships, aircrafts, and railway vehicles; building materials; anti-vibration rubbers for industrial machinery and facilities; various hoses such as diaphragms, rollers, radiator hoses, and air hoses, and hose covers; belts such as power transmission belts; linings; dust boots; medical instrument materials; fenders; insulation materials for electric wires; and other industrial products. In particular, since the crosslinked polymer obtained using the polymer composition according to the present embodiment has excellent balance between rigidity, wear resistance, and viscoelastic properties, it can be suitably used as a material for tire treads and sidewalls.

2. EXAMPLES

While specific examples of the disclosure will be described below, the disclosure is not limited to these examples. Here, "%" in the following production examples, examples and comparative examples is based on mass unless otherwise specified.

In the following examples and comparative examples, a method of measuring values of physical properties is as follows.

2.1. Method of Measuring Physical Properties (1) Vinyl Group Content

The vinyl group content was calculated from the 500 MHz, $^1$H-NMR spectrum of the polymer before hydrogenation.

(2) Weight Average Molecular Weight

The weight average molecular weight was determined in terms of polystyrene using gel permeation chromatography (GPC, GMHHR-H column: commercially available from Tosoh Corporation).

(3) Hydrogenation Rate

The hydrogenation rate was calculated from the 100 MHz, $^1$H-NMR spectrum using ethylene tetrachloride as a solvent.

(4) Melt Flow Rate (MFR)

The melt flow rate was measured at 230° C. and a load of 21.2 N according to the test method described in "JIS K 7210."

2.2. Production Example

<Production of Hydrogenation Catalyst>

[Synthesis of catalyst E] A 1 L volume three-neck flask including a stirrer and a dropping funnel was purged with dry nitrogen, and 200 ml of anhydrous tetrahydrofuran and 0.2 mol of tetrahydrofurfuryl alcohol were added. Then, a solution containing n-butyllithium/cyclohexane (0.2 mol) was added dropwise to the three-neck flask at 15° C. and the reaction was caused, and a tetrahydrofuran solution containing tetrahydrofurfuryl oxy lithium was obtained.

Next, a 1 L volume three-neck flask including a stirrer and a dropping funnel was purged with dry nitrogen, and 49.8 g (0.2 mol) of bis(η5-cyclopentadienyetitanium dichloride and 250 ml of anhydrous tetrahydrofuran were added. Then, a tetrahydrofuran solution containing tetrahydrofurfuryl oxy lithium obtained by the above method was added dropwise at room temperature for about 1 hour with stirring. After about 2 hours, the reddish brown liquid was filtered, and the insoluble part was washed with dichloromethane.

Then, the filtrate and the washing solution were combined and the solvent was removed under a reduced pressure to obtain a catalyst E [bis(η5-cyclopentadienyetitanium (tetrahydrofurfuryloxy) chloride] (referred to as "[chlorobis(2,4-cyclopentadienyl)titanium (IV) tetrahydrofurfuryl alkoxide]"). Here, the yield was 95%.

Production Example of Polymer (A-1)

25,900 g of cyclohexane, 26 g of tetrahydrofuran, 1,273 g of styrene, and 2,361 g of 1,3-butadiene were put into an autoclave reactor having an internal volume of 50 L purged with nitrogen. The temperature of the content in the reactor was adjusted to 45° C., and a cyclohexane solution containing n-butyllithium (39 mmol) was then added to start polymerization. The polymerization was performed under heat insulation conditions, and the maximum temperature reached 80° C.

The polymerization conversion rate that reached 99% was confirmed and 111 g of butadiene was then added, and the mixture was additionally polymerized for 5 minutes to obtain a reaction solution containing the polymer. 2 mmol of silicon tetrachloride was added to the obtained reaction solution and reacted for 10 minutes, and 28 mmol of N,N-dimethyl-3-(triethoxysilyl)propylamine was additionally added, and reacted for 20 minutes.

Then, the reaction solution was set to 80° C. or higher, hydrogen was introduced into the system, and 3.2 g of diethyl aluminum chloride, 2.4 g of a catalyst, and n-butyllithium (15 mmol) were then added, hydrogen was supplied while maintaining a hydrogen pressure of 0.7 MPa or more until a predetermined hydrogen integrated value was reached, a hydrogenation reaction was caused and the reaction solution was then returned to room temperature and normal pressure and removed from the reaction container, and a polymer solution was obtained.

1.4 g of 2,6-di-tert-butyl-p-cresol was added to the obtained polymer solution containing hydrogenated conjugated diene copolymers. Then, a aqueous solution (temperature: 80° C.) whose pH was adjusted to 8.5 (pH at 80° C. determined by a glass electrode method) with ammonia as a pH adjusting agent was put into a desolvation tank, the polymer solution (a ratio of 1,000 parts by mass of the aqueous solution with respect to 100 parts by mass of the polymer solution) was additionally added thereto, the solvent was removed by performing steam stripping (steam temperature: 190° C.) at a liquid phase temperature of 95° C. in the desolvation tank for 2 hours, drying was performed with a heat roller adjusted to 110° C., and thereby a conjugated diene polymer A-1 was obtained. The amount of bound styrene of the obtained conjugated diene polymer A-1 was 34 mass %, the vinyl group content was 27 mol %, the 1st peak weight average molecular weight was $20\times10^4$, the weight average molecular weight (total weight average molecular weight) was $34\times10^4$, the hydrogenation rate was 93%, and the glass transition temperature was −34° C.

Production Example of Polymer (A-2)

A conjugated diene polymer A-2 was obtained in the same operation as in the production example of Polymer (A-1) except that 67 g of tetrahydrofuran, 370 g of styrene, and 3,264 g of 1,3-butadiene were used, and 27 mmol of piperidine was added to a cyclohexane solution containing n-butyllithium (39 mmol) added as a polymerization initiator. The amount of bound styrene of the obtained conjugated diene polymer A-2 was 10 mass %, the vinyl group content was 35 mol %, the 1st peak weight average molecular weight was $22\times10^4$, the weight average molecular weight (total weight average molecular weight) was $38\times10^4$, the hydrogenation rate was 92%, and the glass transition temperature was −52° C.

Production Example of Polymer (B-1)

800 parts of deaerated/dehydrated cyclohexane, 50 parts of 1,3-butadiene, and 0.03 parts of tetrahydrofuran were put into a reaction container purged with nitrogen, 0.14 parts of n-butyllithium was added thereto at a polymerization initiation temperature of 70° C., and high temperature polymerization was performed. After the polymerization conversion rate reached 99% or more, the reaction solution was cooled to 24° C., 42.5 parts of 1,3-butadiene, 7.5 parts of styrene, and 16 parts of tetrahydrofuran were added thereto, and high temperature polymerization was additionally performed. After the polymerization conversion rate reached 99% or more, 0.09 parts of dichloromethylsilane was added thereto, and high temperature polymerization was additionally performed. The block copolymer was a block copolymer including a polymer block A containing a structural unit derived from 1,3-butadiene and having a vinyl group content of 12% and a polymer block B containing a structural unit derived from 1,3-butadiene and a structural unit derived from styrene and having a vinyl group content of 35%. In addition, in the block copolymer, the weight average molecular weight was 230,000. Then, 0.04 parts of diethyl aluminum chloride and 0.08 parts of bis(cyclopentadienyl) titanium furfuryl oxychloride were put into the reaction container and stirred. The hydrogenation reaction started at a hydrogen gas supply pressure of 0.7 MPa-Gauge and a reaction temperature of 80° C., the reaction solution was brought to a normal pressure at 60° C. after 3.0 hours and removed from the reaction container, and put into water with stirring, the solvent was removed by water vapor distillation, and thereby a block copolymer (B-1) having a hydrogenation rate of 83% of the conjugated diene was obtained. The following Table 1 shows values of various physical properties of the obtained block copolymer (B-1) and the like.

Production Example of Polymer (B-2)

800 parts of deaerated/dehydrated cyclohexane, 30 parts of 1,3-butadiene, and 0.03 parts of tetrahydrofuran were put into a reaction container purged with nitrogen, 0.14 parts of n-butyllithium was added thereto at a polymerization initiation temperature of 70° C., and high temperature polymerization was performed. After the polymerization conversion rate reached 99% or more, the reaction solution was cooled to 24° C., 34 parts of 1,3-butadiene, 6 parts of styrene, and 16 parts of tetrahydrofuran were added thereto, and high temperature polymerization was additionally performed. After the polymerization conversion rate reached 99% or more, 30 parts of styrene was added and polymerization was performed. The block copolymer was a block copolymer including a polymer block A containing a structural unit derived from 1,3-butadiene and having a vinyl group content of 14%, a polymer block B containing a structural unit derived from 1,3-butadiene and a structural unit derived from styrene and having a vinyl group content of 33%, and a polymer block C composed of a structural unit derived from styrene. In addition, in the block copolymer, the weight average molecular weight was 110,000. Then, 0.04 parts of diethyl aluminum chloride and 0.08 parts of bis(cyclopentadienyl)titanium furfuryl oxychloride were put into the reaction container and stirred. The hydrogenation reaction started at a hydrogen gas supply pressure of 0.7 MPa-Gauge and a reaction temperature of 80° C., the reaction solution was brought to a normal pressure at 60° C. after 3.0 hours and removed from the reaction container, and put into water with stirring, the solvent was removed by water vapor distillation, and thereby a block copolymer (B-2) having a hydrogenation rate of 86% of the conjugated diene was obtained. The following Table 1 shows values of various physical properties of the obtained block copolymer (B-2) and the like.

Production Example of Polymer (B-3)

800 parts of deaerated/dehydrated cyclohexane, 50 parts of 1,3-butadiene, and 0.03 parts of tetrahydrofuran were put into a reaction container purged with nitrogen, 0.14 parts of n-butyllithium was added thereto at a polymerization initiation temperature of 70° C., and high temperature polymerization was performed. After the polymerization conversion rate reached 99% or more, the reaction solution was cooled to 24° C., 42.5 parts of 1,3-butadiene, 7.5 parts of styrene, and 16 parts of tetrahydrofuran were added thereto, and high temperature polymerization was additionally performed. After the polymerization conversion rate reached 99% or more, 0.09 parts of dichloromethylsilane was added thereto, and high temperature polymerization was additionally performed. The block copolymer was a block copolymer including a polymer block A containing a structural unit derived from 1,3-butadiene and having a vinyl group content of 12% and a polymer block B containing a structural unit derived from 1,3-butadiene and a structural unit derived from styrene and having a vinyl group content of 35%. In addition, in the block copolymer, the weight average molecular weight was 230,000. Then, 0.04 parts of diethyl aluminum chloride and 0.08 parts of bis(cyclopentadienyl) titanium furfuryl oxychloride were put into the reaction container and stirred. The hydrogenation reaction started at a hydrogen gas supply pressure of 0.7 MPa-Gauge and a reaction temperature of 80° C., the reaction solution was brought to a normal pressure at 60° C. after 3.0 hours and removed from the reaction container, and put into water with stirring, the solvent was removed by water vapor distillation, and thereby a block copolymer (B-3) having a hydrogenation rate of 98% of the conjugated diene part. The following Table 1 shows values of various physical properties of the obtained block copolymer (B-3) and the like.

Production Example of Polymer (B-4)

800 parts of deaerated/dehydrated cyclohexane, 30 parts of 1,3-butadiene, and 0.03 parts of tetrahydrofuran were put into a reaction container purged with nitrogen, 0.14 parts of n-butyllithium was added thereto at a polymerization initiation temperature of 70° C., and high temperature polymerization was performed. After the polymerization conversion rate reached 99% or more, the reaction solution was cooled to 24° C., 34 parts of 1,3-butadiene, 6 parts of styrene, and 16 parts of tetrahydrofuran were added thereto, and high temperature polymerization was additionally performed. After the polymerization conversion rate reached 99% or more, 30 parts of styrene was added and polymerization was performed. The block copolymer was a block copolymer including a polymer block A containing a structural unit derived from 1,3-butadiene and having a vinyl group content of 14%, a polymer block B containing a structural unit derived from 1,3-butadiene and a structural unit derived from styrene and having a vinyl group content of 33%, and a polymer block C composed of a structural unit derived from styrene. In addition, in the block copolymer, the weight average molecular weight was 110,000. Then, 0.04 parts of diethyl aluminum chloride and 0.08 parts of bis(cyclopentadienyl)titanium furfuryl oxychloride were put into the reaction container and stirred. The hydrogenation reaction started at a hydrogen gas supply pressure of 0.7 MPa-Gauge and a reaction temperature of 80° C., the reaction solution was brought to a normal pressure at 60° C. after 3.0 hours and removed from the reaction container, and put into water with stirring, the solvent was removed by water vapor distillation, and thereby a block copolymer (B-4) having a hydrogenation rate of 98% of the conjugated diene part. The following Table 1 shows values of various physical properties of the obtained block copolymer (B-4) and the like.

Production Example of Polymer (B-5)

800 parts of deaerated/dehydrated cyclohexane, 30 parts of 1,3-butadiene, and 0.03 parts of tetrahydrofuran were put into a reaction container purged with nitrogen, 0.14 parts of n-butyllithium was added thereto at a polymerization initiation temperature of 70° C., and high temperature polymerization was performed. After the polymerization conversion rate reached 99% or more, the reaction solution was cooled to 24° C., 34 parts of 1,3-butadiene, 6 parts of styrene, and 16 parts of tetrahydrofuran were added thereto, and high temperature polymerization was additionally performed. After the polymerization conversion rate reached 99% or more, 30 parts of styrene was added and polymerization was performed. In addition, 0.2 parts of N,N-bis(trimethylsilyl) aminopropylmethyldiethoxysilane was added thereto and reacted for 60 minutes. The block copolymer was a terminal modified block copolymer including a polymer block A containing a structural unit derived from 1,3-butadiene and having a vinyl group content of 14%, a polymer block B containing a structural unit derived from 1,3-butadiene and a structural unit derived from styrene and having a vinyl group content of 33%, and a polymer block C composed of a structural unit derived from styrene. In addition, in the block copolymer, the weight average molecular weight was 110,000. Then, 0.04 parts of diethyl aluminum chloride and 0.08 parts of bis(cyclopentadienyl)titanium furfuryl oxychloride were put into the reaction container and stirred. The hydrogenation reaction started at a hydrogen gas supply pressure of 0.7 MPa-Gauge and a reaction temperature of 80° C., the reaction solution was brought to a normal pressure at 60° C. after 3.0 hours and removed from the reaction container, and put into water with stirring, the solvent was removed by water vapor distillation, and thereby a block copolymer (B-5) having a hydrogenation rate of 98% of the conjugated diene part was obtained. The following Table 1 shows values of various physical properties of the obtained block copolymer (B-5) and the like.

Production Example of Polymer (B-6)

800 parts of deaerated/dehydrated cyclohexane, 50 parts of 1,3-butadiene, and 0.03 parts of tetrahydrofuran were put into a reaction container purged with nitrogen, 0.14 parts of n-butyllithium was added thereto at a polymerization initiation temperature of 70° C., and high temperature polymerization was performed. After the polymerization conversion rate reached 99% or more, the reaction solution was cooled to 24° C., 50 parts of 1,3-butadiene and 16 parts of tetrahydrofuran were added thereto, and high temperature polymerization was additionally performed. After the polymerization conversion rate reached 99% or more, 0.09 parts of dichloromethylsilane was added thereto, and high temperature polymerization was additionally performed. The block copolymer was a block copolymer including a polymer block A containing a structural unit derived from 1,3-butadiene and having a vinyl group content of 13% and a polymer block C containing a structural unit derived from 1,3-butadiene and having a vinyl group content of 40%. In addition, in the block copolymer, the weight average molecular weight was 250,000. The, 0.04 parts of diethyl aluminum chloride and 0.08 parts of bis(cyclopentadienyl) titanium furfuryl oxychloride were put into the reaction container and stirred. The hydrogenation reaction started at a hydrogen gas supply pressure of 0.7 MPa-Gauge and a reaction temperature of 80° C., the reaction solution was brought to a normal pressure at 60° C. after 3.0 hours and removed from the reaction container, and put into water with stirring, the solvent was removed by water vapor distillation, and thereby a block copolymer (B-6) having a hydrogenation rate of 98% of the conjugated diene part was obtained. The following Table 1 shows values of various physical properties of the obtained block copolymer (B-6) and the like.

Production Example of Polymer (B-7)

800 parts of deaerated/dehydrated cyclohexane, 65 parts of styrene, and 0.03 parts of tetrahydrofuran were put into a reaction container purged with nitrogen, 0.14 parts of n-butyllithium was added thereto at a polymerization initiation temperature of 70° C., and high temperature polymerization was performed. After the polymerization conversion rate reached 99% or more, the reaction solution was cooled to 24° C., 28 parts of 1,3-butadiene, 7 parts of styrene and 16 parts of tetrahydrofuran were added thereto, and high temperature polymerization was additionally performed. After the polymerization conversion rate reached 99% or more, 0.09 parts of dichloromethylsilane was added thereto, and high temperature polymerization was additionally performed. The block copolymer was a block copolymer including a polymer block C containing a structural unit derived from styrene and a polymer block B containing a structural unit derived from 1,3-butadiene and a structural unit derived from styrene and having a vinyl group content of 36%. In addition, in the block copolymer, the weight average molecular weight was 120,000. Then, 0.04 parts of diethyl aluminum chloride and 0.08 parts of bis(cyclopentadienyl)titanium furfuryl oxychloride were put into the reaction container and stirred. The hydrogenation reaction started at a hydrogen gas supply pressure of 0.7 MPa-Gauge and a reaction temperature of 80° C., the reaction solution was brought to a normal pressure at 60° C. after 3.0 hours and removed from the reaction container, and put into water with stirring, the solvent was removed by water vapor distillation, and thereby a block copolymer (B-7) having a hydrogenation rate of 98% of the conjugated diene part was obtained. The following Table 1 shows values of various physical properties of the obtained block copolymer (B-7) and the like.

Production Example of Polymer (B-8)

800 parts of deaerated/dehydrated cyclohexane, 30 parts of 1,3-butadiene, and 0.03 parts of tetrahydrofuran were put into a reaction container purged with nitrogen, 0.14 parts of n-butyllithium was added thereto at a polymerization initiation temperature of 70° C., and high temperature polymerization was performed. After the polymerization conversion rate reached 99% or more, the reaction solution was cooled to 24° C., 34 parts of 1,3-butadiene, 6 parts of styrene, and 16 parts of tetrahydrofuran were added thereto, and high temperature polymerization was additionally performed. After the polymerization conversion rate reached 99% or more, 30 parts of styrene was added and polymerization was performed. The block copolymer was a block copolymer including a polymer block A containing a structural unit derived from 1,3-butadiene and having a vinyl group content of 14%, a polymer block B containing a structural unit derived from 1,3-butadiene and a structural unit derived from styrene and having a vinyl group content of 33%, and a polymer block C composed of a structural unit derived from styrene. In addition, in the block copolymer, the weight average molecular weight was 110,000. Thereby, a block copolymer (B-8) having a hydrogenation rate of 0% of the conjugated diene part was obtained. The following Table 1 shows values of various physical properties of the obtained block copolymer (B-8) and the like.

2.3. Examples 1 to 10 and Comparative Examples 1 to 7

2.3.1. Production of Polymer Composition and Crosslinked Polymer

Components were blended according to the formulation shown in the following Table 2, and these were kneaded to produce polymer compositions. Kneading was performed by the following method.

Using a plastic miller (internal capacity: 250 ml) having a temperature control device, in first kneading, under conditions of a filling rate of 72% and a rotational speed of 60 rpm, a polymer component, silica, a silane coupling agent, extender oil, stearic acid, and zinc oxide shown in the following Table 2 were kneaded. Then, in second kneading, the kneaded product obtained above was cooled to room temperature, and sulfur, a vulcanization accelerator, and an antioxidant were then kneaded, and thereby polymer compositions of Examples 1 to 10 and Comparative Examples 1 to 7 were obtained.

Then, the obtained polymer compositions were molded and vulcanized by vulcanization pressing at 160° C. for a predetermined time to obtain crosslinked polymers having predetermined shapes to be subjected to the following evaluation tests.

2.3.2. Evaluation of Polymer Composition and Crosslinked Polymer

The obtained polymer compositions and crosslinked polymers were subjected to the following evaluation tests. The results are shown in the following Table 2.

<Wear Resistance>

The crosslinked polymers obtained above were used as measurement samples, and the wear resistance was measured according to JIS K6264-1, 2:2005 using a Lambourn wear tester (commercially available from Iwamoto Quartz Glasslab Co., Ltd.) under conditions of a temperature of 20° C. and a slip rate of 50%. In the following Table 2, the wear resistance is shown as an index based on the measured value of Comparative Example 1 that was set as 100, and a larger index indicates a smaller wear amount, and better wear resistance when made into a tire.

<Steering Stability>

The crosslinked polymers obtained above were used as measurement samples, and the steering stability was measured using an ARES viscoelasticity test device (commercially available from TA Instruments) under conditions of a tensile strain of 0.1 to 10% and an angular velocity of 100 radians/sec, and 50° C. In the following Table 2, the steering stability is shown as an index based on the measured value of Comparative Example 1 that was set as 100, a larger index indicates higher rigidity, and better steering stability when made into a tire.

17

<Low RR Property (50° C. Tan δ)>

The crosslinked polymers obtained above were used as measurement samples, and ΔG' was measured using an ARES viscoelasticity test device (commercially available from TA Instruments) under conditions of a tensile strain of 0.7%, an angular velocity of 100 radians/sec, and a temperature of 50° C. In the following Table 2, the low RR property is shown as an index based on the measured value of Comparative Example 1 that was set as 100, and a larger index indicates smaller adverse affects on the viscoelastic properties (RR property) and better viscoelastic properties.

<Wet Grip Performance (0° C. Tan δ)>

The crosslinked polymers obtained above were used as measurement samples, and the wet grip performance was measured using an ARES viscoelasticity test device (commercially available from TA Instruments) under conditions of a tensile strain of 0.14%, an angular velocity of 100 radians/sec, and a temperature of 0° C. In the following Table 2, the wet grip performance is shown as an index based on the measured value of Comparative Example 1 that was set as 100, and a larger index indicates better and favorable wet grip performance.

<Processability (Blended Mooney Viscosity)>

The polymer compositions before vulcanization were used as measurement samples, and according to JIS K6300-1:2013, an L rotor was used, and a Mooney viscosity $ML_{1+4}$ was measured under conditions of a preheating of 1 minute, a rotor operation time of 4 minutes, and a temperature of 100° C. In the following Table 2, the viscosity is shown as an index based on the measured value of Comparative Example 1 that was set as 100, and a larger index indicates better processability.

2.4. Evaluation Results

The following Table 1 shows the structure and values of physical properties of the component (B) produced above. The following Table 2 shows the compositions and evaluation results of the polymer compositions used in examples and comparative examples.

TABLE 1

| | | Polymer (B-1) | Polymer (B-2) | Polymer (B-3) | Polymer (B-4) | Polymer (B-5) | Polymer (B-6) | Polymer (B-7) | Polymer (B-8) |
|---|---|---|---|---|---|---|---|---|---|
| start terminal block structure before coupling | Start terminal ↓ End terminal | Butadiene polymer block A Random copolymer block B of styrene/ butadiene | Butadiene polymer block A Random copolymer block B of styrene/ butadiene | Butadiene polymer block A Random copolymer block B of styrene/ butadiene | Butadiene polymer block A Random copolymer block B of styrene/ butadiene Styrene polymer block C | Butadiene polymer block A Random copolymer block B of styrene/ butadiene Styrene polymer block C | Butadiene polymer block A Butadiene polymer block C | Styrene polymer block C Random copolymer block B of styrene/ butadiene | Butadiene polymer block A Random copolymer block B of styrene/ butadiene Styrene polymer block C |
| End terminal block structure before coupling | End terminal | | | | | | | | |
| Content of conjugated diene polymer block A | mass % | 50 | 30 | 50 | 30 | 30 | 50 | 0 | 30 |
| Vinyl group content of conjugated diene polymer block A | % | 12 | 14 | 12 | 14 | 14 | 13 | — | 14 |
| Content of copolymer block B of conjugated diene and aromatic vinyl | mass % | 50 | 40 | 50 | 40 | 40 | 0 | 35 | 40 |
| Vinyl group content of copolymer block B of conjugated diene and aromatic vinyl | % | 35 | 33 | 35 | 33 | 33 | — | 36 | 33 |
| Styrene content of copolymer block B of conjugated diene and aromatic vinyl | mass % | 15 | 15 | 15 | 15 | 15 | — | 20 | 15 |
| Hydrogenation rate of conjugated diene part | % | 83 | 86 | 98 | 98 | 98 | 98 | 98 | 0 |
| Terminal modification | | None | None | None | None | Yes | None | None | None |
| Weight average molecular weight | Ten thousand | 23 | 11 | 23 | 11 | 11 | 25 | 12 | 11 |
| Coupling | | — | Yes | None | Yes | None | None | Yes | None | None |
| Coupling agent | | — | Methyl-dichloro-silane | — | Methyl-dichloro-silane | — | — | Methyl-dichloro-silane | — | — |
| Coupling rate | % | — | 80 | — | 80 | — | — | 80 | — | — |
| MFR | g/10 min @ 230° C. | 1.4 | 1.2 | 1 | 0.9 | 0.9 | 0.9 | 2.1 | Not measurable |

TABLE 2

| | | Example 1 | Example 2 | Example 3 | Example 4 | Example 5 | Comparative Example 1 | Comparative Example 2 | Comparative Example 3 | Comparative Example 4 |
|---|---|---|---|---|---|---|---|---|---|---|
| (A) Conjugated diene rubber | SBR | 80 | 80 | 80 | 80 | 80 | 80 | 80 | 80 | 80 |
| | Polymer (A-1) | | | | | | | | | |
| | Polymer (A-2) | | | | | | | | | |
| | IR | 20 | 20 | 20 | 20 | 20 | 20 | 20 | 20 | 20 |
| Addition polymer | Polymer (B-1) | 15 | | | | | | | | |
| | Polymer (B-2) | | 15 | | | | | | | |
| | Polymer (B-3) | | | 15 | | | | | | |
| | Polymer (B-4) | | | | 15 | | | | | |
| | Polymer (B-5) | | | | | 15 | | | | |
| | Polymer (B-6) | | | | | | | | 15 | |
| | Polymer (B-7) | | | | | | | | | 15 |
| | Polymer (B-8) | | | | | | | | | |
| | LLDPE | | | | | | | | | |
| Silica | | 55 | 55 | 55 | 55 | 55 | 55 | 70 | 55 | 55 |
| Silane coupling agent | | 4.4 | 4.4 | 4.4 | 4.4 | 1.4 | 4.4 | 4.4 | 4.4 | 4.4 |
| Extender oil | | 20 | 20 | 20 | 20 | 20 | 20 | 20 | 20 | 20 |
| Zinc oxide | | 3 | 3 | 3 | 3 | 3 | 3 | 3 | 3 | 3 |
| Stearic acid | | 2 | 2 | 2 | 2 | 2 | 2 | 2 | 2 | 2 |
| Antioxidant | | 1 | 1 | 1 | 1 | 1 | 1 | 1 | 1 | 1 |
| Vulcanization accelerator CZ | | 1.5 | 1.5 | 1.5 | 1.5 | 1.5 | 1.5 | 1.5 | 1.5 | 1.5 |
| Vulcanization accelerator D | | 1.8 | 1.8 | 1.8 | 1.8 | 1.8 | 1.8 | 1.8 | 1.8 | 1.8 |
| Sulfur | | 1.5 | 1.5 | 1.5 | 1.5 | 1.5 | 1.5 | 1.5 | 1.5 | 1.5 |
| Evaluation result | Wear resistance | 102 | 104 | 90 | 92 | 95 | 100 | 111 | 75 | 82 |
| | Steering stability | 120 | 122 | 125 | 123 | 123 | 100 | 130 | 128 | 106 |
| | Low RR property | 120 | 110 | 116 | 107 | 118 | 100 | 75 | 106 | 76 |
| | Wet grip performance | 95 | 94 | 92 | 91 | 92 | 100 | 75 | 84 | 90 |
| | Processability | 96 | 97 | 90 | 91 | 90 | 100 | 79 | 80 | 85 |

| | | Comparative Example 5 | Comparative Example 6 | Example 6 | Example 7 | Example 8 | Example 9 | Example 10 | Comparative Example 7 |
|---|---|---|---|---|---|---|---|---|---|
| (A) Conjugated diene rubber | SBR | | | | | | | | |
| | Polymer (A-1) | 80 | 80 | | | | 60 | 20 | 80 |
| | Polymer (A-2) | | | 80 | | | 20 | 60 | |
| | IR | | | | 80 | 80 | 20 | 60 | |
| Addition polymer | Polymer (B-1) | 20 | 20 | 20 | 20 | 20 | 20 | 20 | 20 |
| | Polymer (B-2) | | | | 15 | | | | |
| | Polymer (B-3) | | | 15 | | | | | |
| | Polymer (B-4) | | | | | 15 | | | |
| | Polymer (B-5) | | | | | | | 15 | |
| | Polymer (B-6) | | | | | | 15 | | |
| | Polymer (B-7) | | | | | | | | |
| | Polymer (B-8) | | | | | | | | |
| | LLDPE | 15 | 15 | | | | | | |
| Silica | | 55 | 55 | 55 | 55 | 55 | 55 | 55 | 55 |
| Silane coupling agent | | 4.4 | 4.4 | 4.4 | 4.4 | 4.4 | 4.4 | 4.4 | 4.4 |
| Extender oil | | 20 | 20 | 20 | 20 | 20 | 20 | 20 | 20 |
| Zinc oxide | | 3 | 3 | 3 | 3 | 3 | 3 | 3 | 3 |
| Stearic acid | | 2 | 2 | 2 | 2 | 2 | 2 | 2 | 2 |

TABLE 2-continued

| | | | | | | | | | |
|---|---|---|---|---|---|---|---|---|---|
| Antioxidant | | 1 | 1 | 1 | 1 | 1 | 1 | 1 | 1 |
| Vulcanization accelerator CZ | | 1.5 | 1.5 | 1.5 | 1.5 | 1.5 | 1.5 | 1.5 | 1.5 |
| Vulcanization accelerator D | | 1.8 | 1.8 | 1.8 | 1.8 | 1.8 | 1.8 | 1.8 | 1.8 |
| Sulfur | | 1.5 | 1.5 | 1.5 | 1.5 | 1.5 | 1.5 | 1.5 | 1.5 |
| Evaluation result | Wear resistance | 86 | 78 | 142 | 144 | 126 | 141 | 139 | 155 |
| | Steering stability | 96 | 132 | 125 | 125 | 127 | 127 | 124 | 103 |
| | Low RR property | 90 | 78 | 110 | 138 | 132 | 119 | 129 | 97 |
| | Wet grip performance | 88 | 76 | 97 | 98 | 96 | 97 | 99 | 92 |
| | Processability | 98 | 78 | 93 | 96 | 95 | 94 | 94 | 91 |

In Table 2, the numerical value of each component in the composition of the polymer composition represents parts by mass. Here, the following products were used for materials shown in Table 2.

SBR: product name "JSR 1500," styrene•butadiene rubber commercially available from JSR IR: product name "JSR IR2200," polyisoprene rubber commercially available from JSR LLDPE: product name "Novatec LL UJ990," linear low density polyethylene commercially available from Japan Polyethylene Corporation Silica: product name "ZEOSIL 1165MP" commercially available from Rhodia Silane coupling agent: product name "Si75" commercially available from Evonik Industries Extender oil: product name "T-DAE" commercially available from Nippon Oil Corporation Zinc oxide: product name "two types of zinc oxide" commercially available from Hakusui Tech Stearic acid: product name "beads stearic acid camellia" commercially available from NOF Corporation Antioxidant: product name "Ozonone 6C," N-(1,3-dimethylbutyl)-N'-phenyl-p-phenylenediamine commercially available from Seiko Chemical Co., Ltd.

Vulcanization accelerator CZ: product name "Soxinol CZ", N-cyclohexyl-2-benzothiazolesulfenamide commercially available from Sumitomo Chemical Co., Ltd.

Vulcanization accelerator D: product name "Soxinol D," 1,3-diphenylguanidine commercially available from Sumitomo Chemical Co., Ltd.

Sulfur: product name "Golden flower oil treated sulfur powder" commercially available from Tsurumi Chemical Industry Co., Ltd.

Based on the results in Table 2, it was confirmed that, in the polymer compositions according to Examples 1 to 10, crosslinked polymers having improved steering stability and excellent balance between wear resistance and viscoelastic properties were obtained compared to the polymer composition according to Comparative Example 1. In addition, it was confirmed that, when a polymer (B-1) or a polymer (B-2) in which 80 to 97% of the structural unit derived from butadiene was hydrogenated was used as an addition polymer, the balance between physical properties such as wear resistance, viscoelastic properties and processability was further improved compared to when a polymer (B-3) or a polymer (B-4) in which 98% of the structural unit derived from butadiene was hydrogenated was used as an addition polymer.

The disclosure is not limited to the above embodiments, and various modifications can be made. The disclosure includes a configuration substantially the same as the configuration described in the embodiment (for example, a configuration having the same functions, methods and results, or a configuration having the same purposes and effects). In addition, the disclosure includes a configuration in which a non-essential part of the configuration described in the above embodiment is replaced with another configuration. In addition, the disclosure also includes a configuration that exhibits the same actions and effects as the configuration described in the above embodiment or a configuration that can achieve the same purposes. In addition, the disclosure also includes a configuration in which a known technique is added to the configuration described in the above embodiment.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A polymer composition, comprising:
(A) a conjugated diene rubber wherein a polymer corresponding to the following component (B) is excluded; and
(B) a hydrogenated product of the polymer that satisfies the following (1) to (3), which is the polymer in which 80% or more of structural units derived from butadiene are hydrogenated:
(1) being a copolymer of a conjugated diene compound containing butadiene and an aromatic vinyl compound,
(2) comprising a polybutadiene block having a vinyl group content of 20% or less, and
(3) comprising a block composed of a conjugated diene compound and an aromatic vinyl compound,
wherein, when constituent proportions of a structural unit represented by the following Formula (1), a structural unit represented by the following Formula (2), a structural unit represented by the following Formula (3), and a structural unit represented by the following Formula (4) are set as p, q, r, and s, respectively, the component (B) is a hydrogenated conjugated diene polymer that satisfies the following Formula (A):

$0.80 \leq (p+(0.5 \times r))/(p+q+(0.5 \times r)+s) \leq 0.98$     (A)
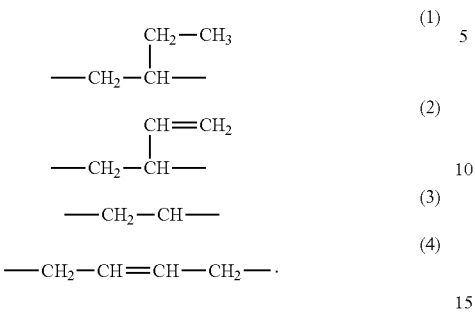
2. The polymer composition according to claim 1, further comprising a crosslinking agent.
3. A crosslinked polymer comprising the polymer composition according to claim 2.
4. A tire comprising the crosslinked polymer according to claim 3.
\* \* \* \* \*